(12) United States Patent
Fischer

(10) Patent No.: US 6,672,752 B2
(45) Date of Patent: Jan. 6, 2004

(54) EXTRUSION APPARATUS WITH WINDING SOCKET

(75) Inventor: Florian Fischer, Ebersberg (DE)

(73) Assignee: A-Z Formen-und Maschinenbau GmbH (DE)

(*) Notice: Subject to any disclaimer, the term of this patent is extended or adjusted under 35 U.S.C. 154(b) by 68 days.

(21) Appl. No.: 09/733,536

(22) Filed: Dec. 8, 2000

(65) Prior Publication Data
US 2002/0126567 A1 Sep. 12, 2002

(30) Foreign Application Priority Data
Dec. 8, 1999 (DE) .......................... 199 59 173

(51) Int. Cl.[7] .............................................. B29B 7/46
(52) U.S. Cl. ......................... 366/83; 366/89; 366/294; 366/295; 366/296
(58) Field of Search ........................ 366/76.1, 76.3, 366/76.6, 79, 80, 81, 83–85, 88–91, 293–296, 318, 321, 323

(56) References Cited

U.S. PATENT DOCUMENTS

| 1,904,884 A | * | 4/1933 | Royle |
| 3,102,716 A | * | 9/1963 | Frenkel |
| 3,164,375 A | * | 1/1965 | Frenkel |
| RE26,147 E | * | 1/1967 | Parshall et al. |
| 3,756,573 A | * | 9/1973 | Sponseller |
| 4,136,969 A | * | 1/1979 | Meyer |
| 4,184,772 A | * | 1/1980 | Meyer |
| 4,779,989 A | * | 10/1988 | Barr |
| 5,421,650 A | * | 6/1995 | Meyer |

FOREIGN PATENT DOCUMENTS

| DE | 31 33 708 C2 | 4/1983 | |
| GB | 842692 | * 7/1960 | .................. 366/80 |

* cited by examiner

Primary Examiner—Charles E. Cooley
(74) Attorney, Agent, or Firm—R W Becker & Associates; R W Becker

(57) ABSTRACT

An extrusion apparatus is provided having an extrusion worm with a threaded exterior passage and rotatably driven by a drive shaft operatively couplable with a drive motor for driving rotation of the drive shaft. A feed in device feeds to the extrusion apparatus material that is to be extruded. The extrusion device includes a socket having a threaded interior passage, the socket receiving therein the extrusion worm in at least partial axial overlap such that material to be extruded passes between and in contact with the threaded exterior passage of the extrusion worm and with the threaded interior passage of the socket. The rate of rotation of the socket and the rate of rotation of the extrusion worm are independently adjustable relative to one another.

17 Claims, 1 Drawing Sheet

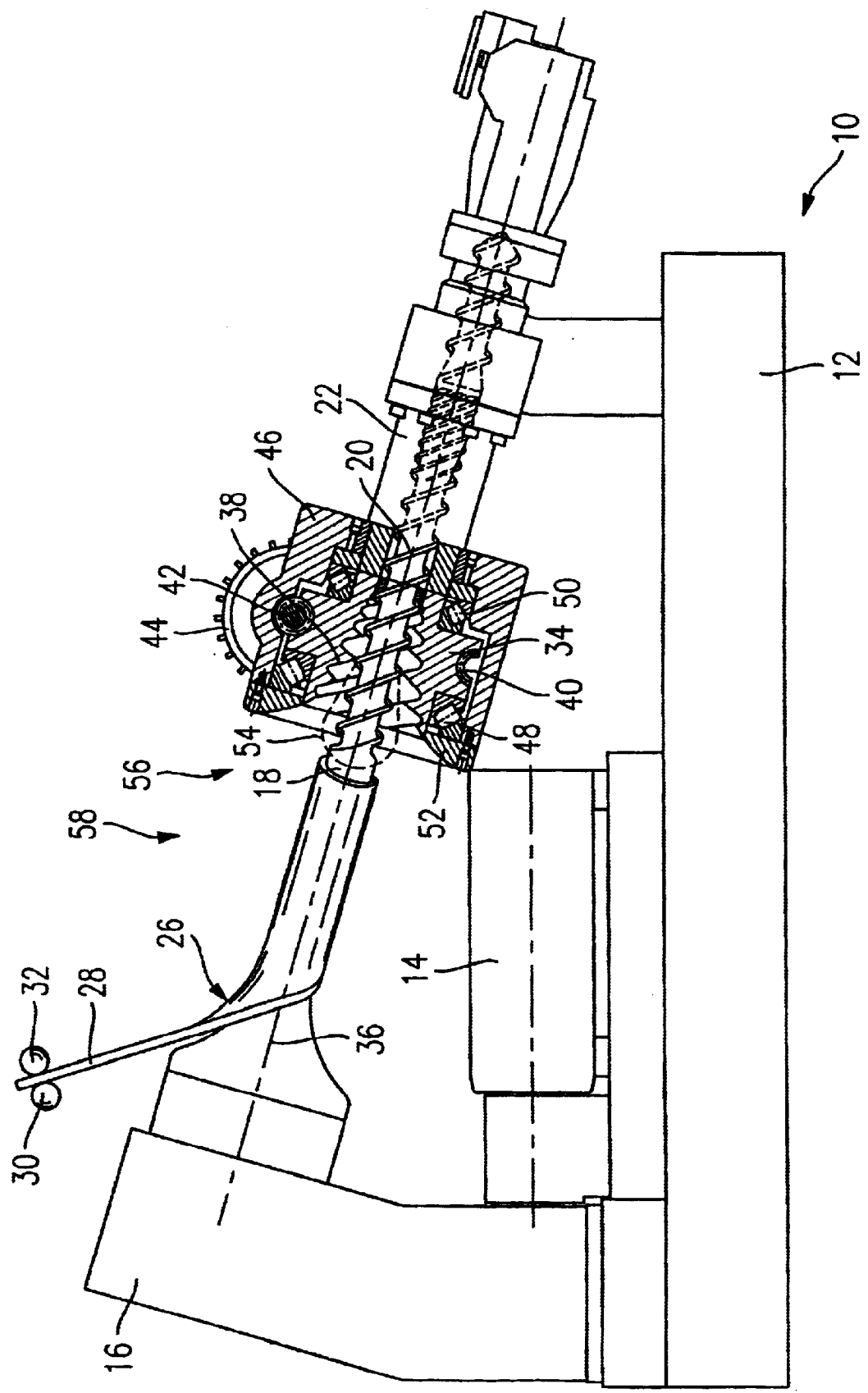

EXTRUSION APPARATUS WITH WINDING SOCKET

BACKGROUND OF THE INVENTION

The present invention relates to an extrusion apparatus and a method for extrusion.

An extrusion apparatus is disclosed, for example, in DE-OS 31 33 708. In an extrusion apparatus of this type, it is intended that the quality of the raw materials in delivery to the extruder be maintained as uniform as possible and in the best possible condition, whereby the material delivery is effected in a radial direction with respect to the extruder worm. There are frequently fluctuations in the performance delivered by such extrusion solutions, in spite of the surplus delivery thereto of the material to be extruded. The noted publication teaches the creation of a special storage or reserve zone which is comprised of a screw element in the extruder housing, whereby an improved and uniform or homogenized distribution of the delivered material should result from this approach.

On the other hand, however, the above-described extrusion solution has not prevailed in that there exists a substantial problem in connection with the radial one-sided loading of the extrusion worm. The delivery of the material effects a substantially strong pressure between the topside of the extruder housing, which is adjacent the delivery funnel, and the extrusion worm. At that location, the material to be worked is compromised and shear loaded with the effect that the extrusion worm is pressed downwardly.

In order to prevent the downward sliding of the extrusion worm on its side onto the extruder housing due to the through bending of the extrusion worm, a predetermined amount of play is typically provided. However, this play on the other hand reduces the working efficiency of the extrusion worm in that the separation thus created leads to the creation of a certain backflow, whereby the to be extruded material in this separation is therein very strongly shear loaded, which is not an especially positive contribution to the properties of the material.

Insofar as the magnitude of the thus produced pressure and the consequent strength of the through bending is a function of the to be extruded material and also the temperature to which the extrusion apparatus has been preheated, a certain security reserve must be built into the operation which further reduces the working efficiency.

It is further known to widen an advancement worm in its entry region and at the same time to configure the entry region in a funnel shape. This approach lends itself to the feed of thermoplastic polymeric material granules, whereby the granules are filled into the funnel in a surplus manner and are advanced in the feed direction by the gravity feed of the advancement worm. However, this approach is basically not suited for the feed of elastomeric material in strip form. While granules are already inclined, by virtue of their own weight, to pre-accumulate or thicken, and are therefore suited for feed by pouring, the feed of material prepared in strips—in other words, generally elastomeric material—must be performed via special feed rollers as a consequence of which the material is indeed pliable but exhibits a certain basic hardening which detracts from using the material as a flow capable material.

In spite of the known drawbacks, a radial material feed has consistently been used in connection with the feed of elastomeric material as the material to be extruded, and the extruders used in such circumstances most typically have a substantially horizontal extending worm.

SUMMARY OF THE INVENTION

The present invention provides a solution to the challenge of providing an extruder which combines an improvement in the extrusion performance with an improved suitability of the to be extruded material strips having various properties.

The solution provided by the present invention is realized by the main claims hereof with additional advantageous features of the invention being set forth in the dependent claims hereof.

In accordance with one embodiment of the extrusion apparatus of the present invention, a substantially axis parallel feed of the to be extruded material is secured by the inventive sleeve or socket. A uniform feed characteristic of the material feed pulse through the inventive inter-peripheral space defined between the socket and the extrusion worm, which tapers in a progressively more restrictive manner, is achieved by the setting of the speed of the extrusion worm and the socket relative to one another. The relative speed difference is a value other than zero but need not be large; instead, it can be discernibly less than the extrusion speed itself. In this manner, the shearing effect of the material is reduced to the required minimum although the desired uniform feed characteristic and, thereby, the filling of the inter-peripheral space is ensured.

The solution of the present invention is particularly advantageous in that, for the first time, an axis parallel feed stocking is made possible notwithstanding the horizontal orientation of the extrusion worm. The extrusion worm is loaded not in a sidewise manner but, instead, only in an axial manner whereby the extrusion worm does not experience any through bending exerted by the material feed pulse. At the same time, however, it is possible to reduce the play between the extruder housing and the extrusion worm so as to thereby improve the working efficiency.

In accordance with the present invention, it is particularly advantageous if the annular gap or inter-peripheral space between the socket and the extrusion worm reduces progressively in size in an axial direction. The material fed to the extruder in strip form can be initially engaged by the extrusion worm or the socket and is then automatically drawn into the conical inter-peripheral space through the spiral-threaded passage of the extrusion worm. However, a thickening results which reduces the possibility that an intake of air occurs, whereby, also, the force introduced due to this circumstance becomes a circumferential force which is applied radially uniformly outwardly against the socket and, on the other hand, radially uniformly inwardly against the extrusion worm and, moreover, the extrusion worm and the extruder housing are loaded in the axial direction. Axial forces can be routinely handled, however, by suitable bearings without additional accommodations beyond that.

In accordance with the present invention, it is particularly advantageous if the socket is provided with an inner thread. The inner thread is preferably configured such that its thread course or path is counter to that of the extrusion worm. Through this configuration, there arises both an inner as well as an outer winding course that supports the feed operation in the intake region. While in known extrusion apparatus a partial back flow, the so-called back disturbance, poses a problem, which is to be countered by special measures such as, for example, the solution disclosed in DE-PS 4 005 400, the control of the rotational speed of the winding socket in accordance with the present invention permits adjustment of the blockage or build up roll. A blockage roll following the beginning of the plasticizing region serves, on the one hand, to promote uniformity of distribution of the feed surpluses but poses, on the other hand, a source of possible disturbances, whereby it is advantageous if one can maintain in a limiting manner the roll size.

In accordance with the present invention, the extrusion apparatus can advantageously be combined with a winding apparatus by which the to be extruded material, which is in a strip configuration in preparation for feeding, is wound about a drive shaft in the feed region, whereby the material strips are already wound in several wraps prior to reaching the winding socket. In one modification of the extruder apparatus of the present invention, it is provided that the decidedly wide material strips are allowed to hang on the drive shaft in a draped manner, whereby the width of the strips in this approach is preferably three-fourths of the circumference of the drive shaft. The winding socket of the present invention can thereupon promote uniform distribution of the material feed about the periphery in that the relative rotation between the winding socket and the extrusion worm ensures that the remaining fourth, which does not have a material strip hanging thereover, is provided with the material advanced in the peripheral direction.

The configuration of the extrusion apparatus involving the hanging material strips permits the use of decidedly thick and thus correspondingly slower to be fed material strips that are at the same time similarly wide. In this manner, the extrusion apparatus of the present invention is also suitable for a high performance classification.

It is to be understood that the rotations per unit time of the inventive winding socket are adaptable across a wide range to the extrusion requirements. It is preferable if the rotational direction of the winding socket is counter to that of the extrusion worm and that the winding socket's rotations per unit time are as large as or less than the rotations per unit time of the extrusion worm and, consequently, the rotations per unit time of the drive shaft. In a modified configuration of the extrusion apparatus of the present invention, it is provided, to be sure, that the direction of rotation of the winding socket is the same as that of the extrusion worm although the rotation per unit time of the winding socket in this configuration is relatively less than that of the extrusion worm. This configuration also produces relative rotational speed, having a value other than zero, which is of inventive significance. This leads to a uniform distribution of a material feed pulse due to the inter-peripheral distribution.

While it is preferred in accordance with the present invention that the winding course of the socket be disposed in the immediate vicinity of the extruder housing to thereby permit a thermal equilibrium to be reached between the typically heated extruder housing and the socket, it is provided, in another modification of the extrusion apparatus of the present invention, that the winding socket can be spatially uncouplable so as to be disposed in the transition region between the drive shaft and the extrusion worm. By this approach, an axial displacement capability for the winding socket can be decidedly easily ensured, whereby it is, however, preferred that the plasticizing of the to be fed material has already been promoted by at least one indirectly heated winding socket.

The winding socket includes at its intake region an intake taper that is either fixed against rotation relative to the winding socket or is fixed against rotation relative to the extruder housing. The intake taper permits the engagement, as well, of decidedly steeply inclined material strips hanging thereat, for example when the extruder is to be run in an empty or uncharged condition and a cleaning substance is extruded.

The inventive socket can alternatively be provided with an interior frictional surface which effects the desired feed operation counter to the feed operation of the extrusion worm without, however, exerting the size reducing and re-configuring effects on the material as are exerted by feeding of the material via a threaded passage.

In a particularly advantageous configuration of the extrusion apparatus of the present invention, it is provided that several material strips are to be fed in the feed operation. While special measures must be implemented in the use of the extrusion apparatus heretofore known in order to ensure an intensive cross mixing of several material strips, the extrusion apparatus of the present invention permits the degree of cross mixing of the material to be already so increased, at the intake side of the extrusion worm, that the so-called transfer region can be omitted. The cross mixing which already occurs in the region of the inventive socket can be adapted to a wide range of requirements by, on the one hand, the temperature of the socket as well as, on the other hand, the rotation per unit time of the socket in relation to the rotation per unit time of the extrusion worm.

It is therefore possible, for example, to allow the flow of the heating medium through the socket, at least in the area of its housing, which also flows through the extruder housing. Due to the relatively close connection between the socket housing and the actual socket, the socket is brought up to the required temperature. In this manner, the extent over which the heating of the materials is provided is inventively automatically lengthened whereby a uniformity of the heating effect occurs. In accordance with the present invention, a particular pipe effect occurs due to the movement produced on the outer periphery of the material being fed which benefits the degree of cross mixing occurring in the intake region of the extruder. Overall, the inventive socket permits an improved extrusion quality by the intake of various materials as well, whereby it is to be understood that the advantages of the present invention are not limited to the use of elastomeric material.

It is self-evident that the angle at which the material in the feed region is fed in is adaptable to a wide range of requirements. For example, the strip feeder for feeding the material strips can be configured such that its outlet axis extends at an angle of, for example, 30 degrees relative to the shaft, whereby the intersection point of the outlet axis with the shaft can then advantageously lie closely behind the beginning of the shaft —thus, adjacent the associated drive motor. The material strips are then directionally reoriented upon their engagement with the shaft and, in fact, are reoriented along an axial direction so that, at the latest upon the reaching of the transition region between the drive shaft and the extrusion worm, the strips run parallel to the axis of the shaft.

Further advantages, details, and features are set forth in the following description of one exemplary embodiment of the present invention together with the one figure of the drawing.

BRIEF DESCRIPTION OF THE DRAWING

FIG. 1 is a schematic side view of one embodiment of the extrusion apparatus of the present invention; and

DETAILED DESCRIPTION OF THE PREFERRED EMBODIMENTS

The sole FIGURE of the drawing shows one embodiment of an extrusion apparatus 10 of the present invention. The extrusion apparatus 10 includes an apparatus base 12 on which a drive motor 14 is supported. The drive motor 14 is disposed on the flank of a drive device 16 from which a drive shaft 18 extends. The drive shaft 18 extends substantially horizontally above the apparatus base 12 and transitions into an extrusion worm 20.

Preferably, the drive shaft 18 and the extrusion worm 20 extend at an angle of between 0 to 45 degrees relative to the horizontal and at an angle of 15 degrees, as viewed in the direction of flow of the material to be extruded.

The extrusion worm 20 extends into an extruder housing 22 that is supported on the apparatus base 12 via a bracket 24.

The drive shaft 18 includes a smooth radiused portion 26 in the vicinity of the drive device 16. The smooth rounded or radiused portion 26 makes possible the feed of a strip of to be extruded material 28 thereonto at a right flat angle. The schematically illustrated feed rollers 30, 32 operate to feed the strip 28 in this manner. The material strips have a width that corresponds to approximately three fourths of the circumference of the drive shaft 18. In the embodiment shown, the side stiffness of each material strip is of a magnitude such that the strip is not wound about the drive shaft 18 upon the rotation thereof but, instead, is guided in a manner parallel to the axis 36 of the shaft 18 to a winding sleeve or socket 34 and the extrusion worm 20.

The winding socket 34 of the present invention is provided on its interior with an inner thread 38. The winding direction of the inner thread 38 is oppositely handed to that of the extrusion worm 20. The winding socket 34 is provided on its exterior circumference with a tangentially extending thread 40 having a semi-circular cross sectional shape. A drive gear 42 threadingly engages the thread 40 to cooperate therewith as an extrusion worm drive, whereby the driving of the drive gear 42 is effected by another drive gear 44. The drive operation is not coupled to the rate of rotation of the drive motor 14 and the rate of rotation of the winding socket 34 can be controlled by a special control apparatus to adjust to the attendant requirements.

As shown in FIG. 1, the socket 34 extends from a location proximate a starting point of the threaded exterior passage to a downstream point of the threaded exterior passage.

The drive gear 42 and the winding socket 34 are housed in a socket housing 46. The socket housing 46 is fixedly secured to the extruder housing 22 in the illustrated embodiment and is also thermally coupled with the extruder housing so as to be correspondingly heated upon heating of the extruder housing while itself transferring heat to the winding socket 34. The support of the winding socket 34 in the socket housing 46 is effected by two conical roller bearings 48, 50 which are oriented in inclined dispositions turned relatively toward one another so as to provide the capability for radial as well as axial forces in its support function.

The socket housing 46 includes an intake taper 52 at its intake side immediately adjacent the winding socket 34. The intake taper 52 tapers substantially radially outwardly such that, on its outer circumference, the intake taper extends practically radially, whereby even material strips being fed from a substantial outward spacing can be re-oriented and fed along the winding socket 34 parallel to the axis.

The winding socket 34 is preferably rotatably driven in a rotation direction opposite to that of the extrusion worm 20. The outer periphery of the fed in material strips 28 is thus moved in a direction during this driving which is opposite to the movement of the inner periphery of the material strips. The material strips are contemporaneously heated and thereby partially plasticized. The blockage roll can be adjusted by control of the speed of the feed rollers 30, 32 relative to the extrusion speed.

In another embodiment of the present invention, an enlargement of the extrusion worm 20 is provided. This enlargement 54 is shown in broken lines in the figure of the drawing. This configuration is particularly suitable if the winding socket is axially displaceable along with its socket housing 46. This permits easy adjustment of an annular gap or inter-peripheral spacing 56 between the winding socket 34 and the extrusion worm 20.

It is to be understood that further variations of the apparatus of the present invention are possible without departing from the scope of the present invention. For example, the use of material in somewhat smaller material strips 28 can also be wound about the drive shaft 18 in the feed in area 58, whereby the feed can then follow either manually or automatically and where the material strip has been wound one turn, the material strip 28 can at the same time be automatically drawn off and fed to the extruder.

The specification incorporates by reference the disclosure of German priority document 199 59 173.3 of Dec. 8, 1999.

The present invention is, of course, in no way restricted to the specific disclosure of the specification and drawings, but also encompasses any modifications within the scope of the appended claims.

What I claim is:

1. An extrusion apparatus comprising:
   a drive shaft operatively couplable with a drive motor for driving rotation of the drive shaft, the drive shaft for receiving thereon from a feed in device material which is to be extruded;
   an extrusion worm having a threaded exterior passage, the extrusion worm being connected to the drive shaft for driving rotation of the extrusion worm and operable to receive from the drive shaft material to be extruded, said extrusion worm having a worm housing, wherein said worm housing is non-rotatable; and
   a socket having a threaded interior passage, the socket receiving therein the extrusion worm in at least partial axial overlap such that material to be extruded passes between and in contact with the threaded exterior passage of the extrusion worm and the threaded interior passage of the socket, wherein said socket extends from a location proximate a start of said threaded exterior passage to a downstream point of said threaded exterior passage.

2. An extrusion apparatus according to claim 1, wherein the socket is rotatable in a direction of rotation different from the direction of rotation of the extrusion worm.

3. An extrusion apparatus according to claim 1, wherein the thread direction of the threaded interior passage of the socket is opposite to the thread direction of the threaded exterior passage of the extrusion worm.

4. An extrusion apparatus according to claim 1, wherein the inner diameter of the threaded interior passage of the socket decreases in the direction of flow of the material passing therethrough to a diameter at the exit end of the threaded interior passage which is substantially the same as the diameter of the threaded exterior passage of the extrusion worm at that axial location.

5. An extrusion apparatus according to claim 4, wherein the inner diameter of the threaded interior passage of the socket decreases in a continuous manner along its axial extent in the direction of flow of the material passing therethrough.

6. An extrusion apparatus according to claim 1, wherein the socket includes an intake taper at the entrance end thereof relative to the direction of flow of the material passing therethrough, the intake taper tapering inwardly relative to the direction of flow.

7. An extrusion apparatus according to claim 1, wherein the rate of rotation of the socket is adjustable relative to the rate of rotation of the extrusion worm.

8. An extrusion apparatus according to claim 1, wherein the pitch of the threaded interior passage of the socket is substantially the same as the pitch of the threaded exterior passage of the extrusion worm.

9. An extrusion apparatus according to claim 1, wherein the material to be extruded is fed to the extrusion apparatus in strip form and the drive shaft is operable to engage a material strip fed thereto for winding advancement of the material strip to the extrusion worm.

10. An extrusion apparatus according to claim 1, and further comprising a housing at least partially covering the socket and the socket is axially displaceable relative the housing.

11. An extrusion apparatus according to claim 1, wherein the drive shaft and the extrusion worm extend at an angle of between 0 to 45 degrees to the horizontal, as viewed in the direction of flow of material to be extruded.

12. An extrusion apparatus according to claim 1, wherein the extrusion worm includes an enlargement that is axially coincident with an enlargement of the socket at the intake end thereof, whereby a spacing between the extrusion worm and the socket is adjustable by substantially horizontal movement of the socket.

13. An extrusion apparatus according to claim 1, wherein the rate of rotation of the socket is less than the rate of rotation of the extrusion worm.

14. An extrusion apparatus according to claim 1, wherein the extrusion worm and the socket rotate in the same direction.

15. An extrusion apparatus according to claim 1, wherein the drive shaft and the extrusion worm extend at an angle of 15 degrees to the horizontal, as viewed in the direction of flow of material to be extruded.

16. A method for extruding material comprising:

feeding material to be extruded onto a rotating drive shaft such that the fed material is advanced therefrom onto an extusion worm having a threaded exterior passage and operatively coupled to the drive shaft for driving rotation of the extrusion worm; and rotating the extrusion worm while also rotating at an independent rate of rotation a socket having a threaded interior passage which Is at least partially overlapping with the extrusion worm, the rotation of the extrusion warm and the socket being controlled such that the material is drawn in between the extrusion worm and the socket, and is in contact with the threaded exterior passage of the extrusion worm and the threaded interior passage of the socket, wherein said socket extends from a location proximate a start of said threaded exterior passage to a downstream point of said threaded exterior passage.

17. An extrusion apparatus comprising:

a drive shaft operatively couplable with a drive motor for driving rotation of the drive shaft, the drive shaft for receiving thereon from a feed in device material which is to be extruded;

an extrusion worm having a threaded exterior passage, the extrusion worm being connected to the drive shaft for driving rotation of the extrusion worm and operable to receive from the drive shaft material to be extruded; and a socket having a threaded interior passage, the socket receiving therein the extrusion worm in at least partial axial overlap such that material to be extruded passes between and in contact with the threaded exterior passage of the extrusion worm and the threaded interior passage of the socket and the rate of rotation of the socket and the rate of rotation of the extrusion worm being independently adjustable relative to one another, wherein the diameter of the socket at its entrance end at which the material to be extruded passes thereinto is generally three times the outer diameter of the extrusion worm and the entrance end of the socket is downstream of the entrance end of the extrusion worm relative to the direction of flow of the material to be extruded.

* * * * *